United States Patent
White

(10) Patent No.: US 7,136,879 B2
(45) Date of Patent: Nov. 14, 2006

(54) SYSTEM AND METHOD FOR READ-ONLY ENTITY BEAN CACHING

(75) Inventor: Seth White, San Francisco, CA (US)

(73) Assignee: BEA Systems, Inc., San Jose, CA (US)

(*) Notice: Subject to any disclaimer, the term of this patent is extended or adjusted under 35 U.S.C. 154(b) by 457 days.

(21) Appl. No.: 10/340,301

(22) Filed: Jan. 10, 2003

(65) Prior Publication Data

US 2003/0167256 A1    Sep. 4, 2003

Related U.S. Application Data

(60) Provisional application No. 60/349,433, filed on Jan. 18, 2002.

(51) Int. Cl.
G06F 12/16    (2006.01)

(52) U.S. Cl. .......................... 707/201; 707/2

(58) Field of Classification Search ............ 707/3, 707/2, 10, 201; 711/113
See application file for complete search history.

(56) References Cited

U.S. PATENT DOCUMENTS

| | | | | |
|---|---|---|---|---|
| 5,951,695 A | * | 9/1999 | Kolovson | 714/16 |
| 6,038,601 A | * | 3/2000 | Lambert et al. | 709/226 |
| 6,298,478 B1 | | 10/2001 | Nally et al. | 717/6 |
| 6,321,235 B1 | * | 11/2001 | Bird | 707/203 |
| 6,457,065 B1 | | 9/2002 | Rich et al. | 709/328 |
| 2001/0047394 A1 | * | 11/2001 | Kloba et al. | 709/217 |

\* cited by examiner

Primary Examiner—Anthony Knight
Assistant Examiner—Luke Osborne
(74) Attorney, Agent, or Firm—Fliesler Meyer LLP

(57) ABSTRACT

Separate instances of a data item can be allocated for each transaction in a system. Each instance can be held by an entity bean capable of updating by either reading a copy of the data item from the database or by reading a copy from another entity bean. When the data item in the database is changed, the system can notify each entity bean that it should read an updated copy of the data item before the next transaction.

37 Claims, 3 Drawing Sheets

SYSTEM AND METHOD FOR READ-ONLY ENTITY BEAN CACHING

CLAIM OF PRIORITY

This application claims priority to U.S. Provisional Patent Application No. 60/349,433, filed Jan. 18, 2002, entitled "System and Method for Read-Only Entity Bean Caching," which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS REFERENCE TO RELATED PATENT DOCUMENTS

The following co-pending U.S. patent documents are assigned to BEA Systems, Inc., the assignee of the present application, and these documents are hereby incorporated herein by reference:

(A) U.S. patent application Ser. No. 10/340,067 filed Jan. 10, 2003, to Seth White et al. and entitled, "System and Method for Heterogeneous Caching" now U.S. Pat. No. 6,978,278 issued Dec. 20, 2005; and (B) U.S. patent application Ser. No. 10/340,023 filed Jan. 10, 2003, to Seth White et al. and entitled, "System and Method for Optimistic Caching" now U.S, Pat. No. 7,020,684 issued Mar. 28, 2006.

(C) U.S. patent application Ser. No. 09/975,590 filed Oct. 11, 2001, to Dean Bernard Jacobs et al. and entitled "Data Replication Protocol".

FIELD OF THE INVENTION

The invention relates generally to the caching of data, such as for transactions.

BACKGROUND

In an environment where multiple users can concurrently access data, many systems currently hold a copy of each data item in a read-only entity bean. A single instance of each read-only bean is kept in memory so that transactions can access the read-only bean instead of hitting the database. In order to prevent the transactions from stepping on each other, the transactions are able to utilize an exclusive lock such that the transaction can lock that read-only bean for its own exclusive use during each method call on the bean. The current transaction can be suspended, a new transaction can be started, and the bean can be locked on behalf of the new transaction and the method on the bean called by the new transaction. One problem with this approach is that it requires a lot of overhead. It is necessary for the system to manage the suspending, resuming, and committing of transactions.

Exclusive locking, such as in an entity bean container, also limits scalability. Exclusive locking is undesirable in many applications because the data is read-only and many users wish to be able to view the data at the same time and not have to wait for earlier transactions to finish.

BRIEF SUMMARY

Systems and methods in accordance with one embodiment of the present invention can provide for improved data caching for transactions. Each transaction can require the reading of a data item that is contained in a database. The data item can be read into a cache capable of caching instances of the data item. An allocation algorithm can allocate each instance of the data item to one of the transactions. Each instance can be held by an entity bean stored in the cache, for example, such as an entity bean container. Any other mechanism for storing an instance of a data item can also be used in accordance with embodiments of the present invention. Each bean can have associated with it a time-out value that can help to determine how long the bean should hold the instance of the data item. After the time-out value has expired, the bean can obtain a new instance of the data item by reading from the database or from another bean in a bean container. The system can also notify each bean in the container when the data item in the database is changed.

Other features, aspects, and objects of the invention can be obtained from a review of the specification, the figures, and the claims.

DETAILED DESCRIPTION

Figure 1:
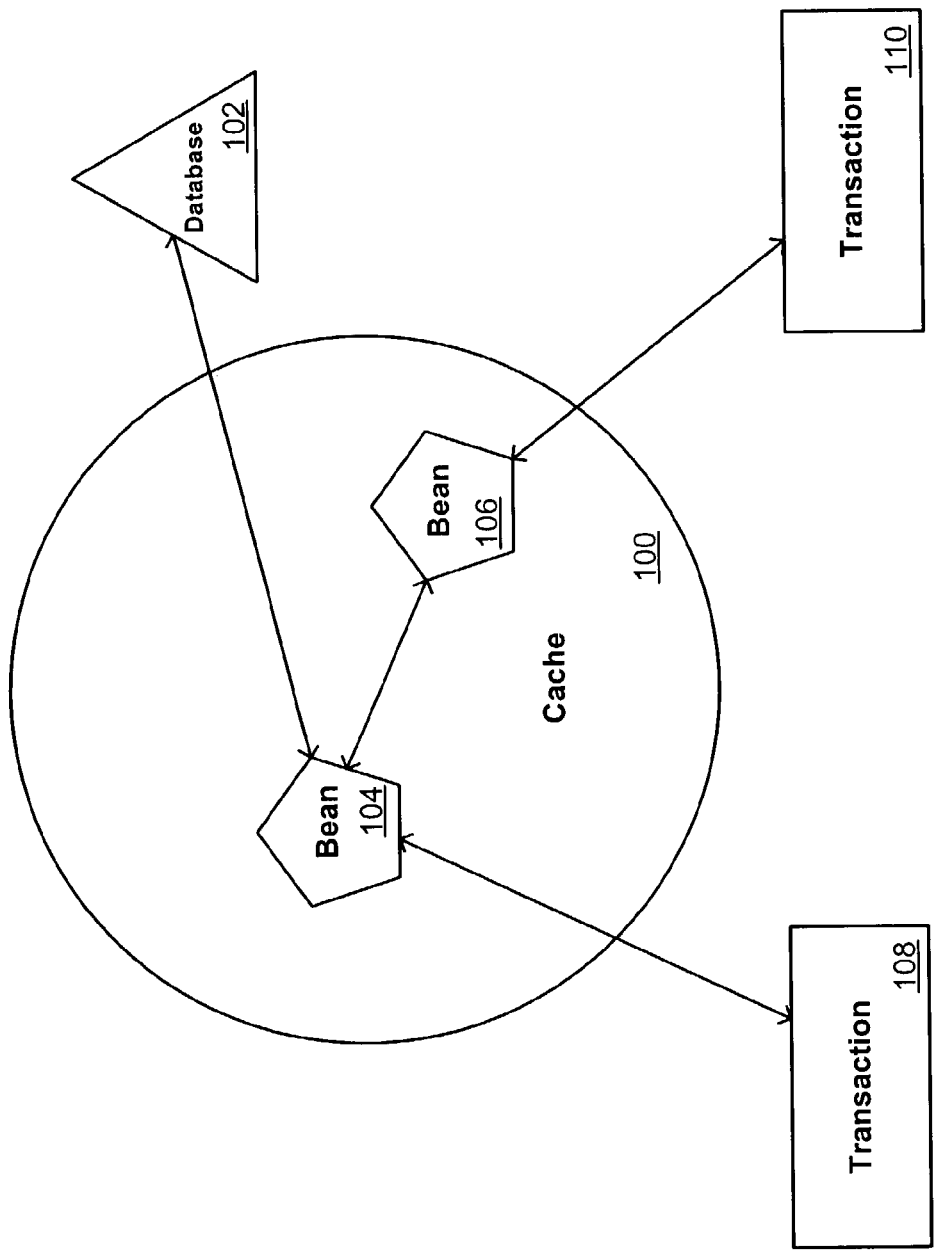
FIG. 1 is a diagram of a system in accordance with one embodiment of the present invention.

Systems and methods in accordance with one embodiment of the present invention can allow multiple users to concurrently view data by allocating multiple instances of the same bean. Each transaction can be given its own instance, such that the transactions can read and use the data in parallel. The system can activate and manage the multiple copies, and can keep the copies consistent with the underlying data. The transactions can then read the data from the bean instances, such as for example entity bean, session bean, or Enterprise JavaBean instances, without having to access the database. For backward compatibility, the system can also include an option enabling exclusive locking for certain transactions. For instance, an existing application might require an exclusive lock on a data item. The system can allow for an exclusive lock where it is needed, but disallow locking for all other cases. Where the data is not going to change, there will be no anomalies or inconsistencies generated by allowing users to view the data concurrently. For example, there is no reason why a thousand users requesting the price of a new release compact disc at an online store should have to wait "their turn" to view the price.

One way to keep the beans reasonably synchronized with data in the database is to associate a "time-out" or "time-to-live" value with each bean. After a bean has been in existence for a period of time equal to its "time-out" value, the bean will expire and the transaction will have to acquire a new instance of the bean that contains a potentially newer version of the data. In some systems, however, this approach may still be a little too resource intensive. Also, this approach might be most useful for systems in which this type of data is not often changed or is not changed by these types of transactions.

Systems and methods in accordance with another embodiment of the present invention can reduce the number of hits to the database even further by using an algorithm to find recent copies of the data. Such an algorithm might include checking version numbers or indices of each copy, checking the age of each copy, or checking information from a list holding information for each copy. Using such an algorithm, a bean that reaches its time-out period can look to see if there is another bean in the system that contains a more recent copy of the data held by that bean. If the bean finds a more recent copy, or a bean in a more recent state, the timed-out bean can read data from the bean with the more recent version instead of going to the database. The system can also keep a list of beans, or at least the identity of the most recent bean, so that timed-out beans can easily identify the most recent beans. This approach, however, can result in beans not having the most recent version of the data, as beans will only read current data from the database when there is not a more recent copy of the data in the system.

Users can balance the need to conserve resources with the need to have the most recent copy of the data when deciding between the above two exemplary systems. For an application in which there are many users, but for which the data does not often change, it might be better to allow beans to read from each other to conserve resources. In applications where it is important that users get the most up-to-date data, or where the data changes more often, it might be desirable for each bean to read from the database.

An example of such a system is shown in FIG. 1. A cache 100, such as an entity bean container, can cache beans 104 and 106. Beans 104 and 106 are separate instances that are associated with the same data in the database 102. Bean 104 is allocated by the system to transaction 108, and bean 106 is allocated to transaction 110. If bean 104 is timed-out, it can obtain a more recent copy of the data by reading from the database 102 or reading the data from bean 106. Bean 104 can read from bean 106, if bean 106 has a newer copy of the data, is a "younger" bean, or if it has the same version of the data, but has an updated state. If bean 106 does not meet any of these criteria, bean 104 can read the data from the database 102. The system can also have a more intelligent algorithm that allows bean 104 to read from bean 106 when there are many users on the system, and allows bean 104 to read from the database when there are few users of the system. This allows a user to get the most recent data when the resources are available.

Figure 2:
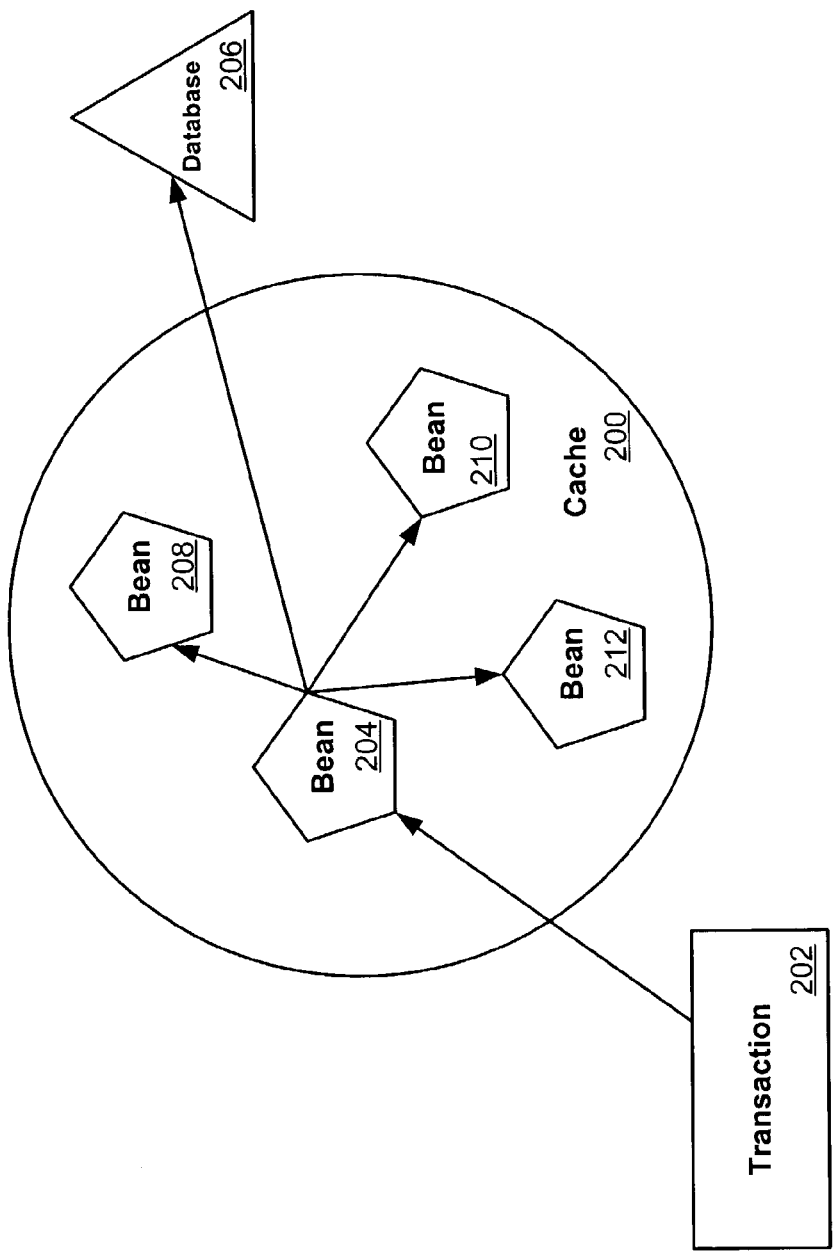
FIG. 2 is a diagram of a system in accordance with another embodiment of the present invention.

Either of the above systems can utilize a notification algorithm. A notification algorithm can be any algorithm useful in notifying other beans of updates, such as by multicasting a message to the beans or by contacting each relevant bean instance directly by a point-to-point protocol. Messages can be sent any of a number of places in a cluster or on a network, such as from a cluster server, a server manager, a cluster manager, a bean, a database, and a database manager. For example, in FIG. 2 a transaction 202 causes a bean 204 in cache 200 to update data in the database 206. In this example, the bean 204 also sends an update message to other beans 208, 210, 212 in the cache 200 holding an instance of the data item being held and updated by the bean 204. This message can alert the beans 208, 210,212 that the data has been updated, can tell them to drop their instance, or can include the updated data itself so the beans can automatically have the updated version.

When using a notification algorithm, any bean that receives an updated copy of the data can notify all other beans associated with that data that the data has changed. This can allow the system to propagate the new data more quickly, as beans can know that they need to update data before beginning a new transaction, whether the beans read the data from the database or from another bean. Also, the system can send out invalidation messages, such as by multicasting, so each bean can know to re-read the data the next time a transaction needs the data, or when a bean times-out.

Figure 3:
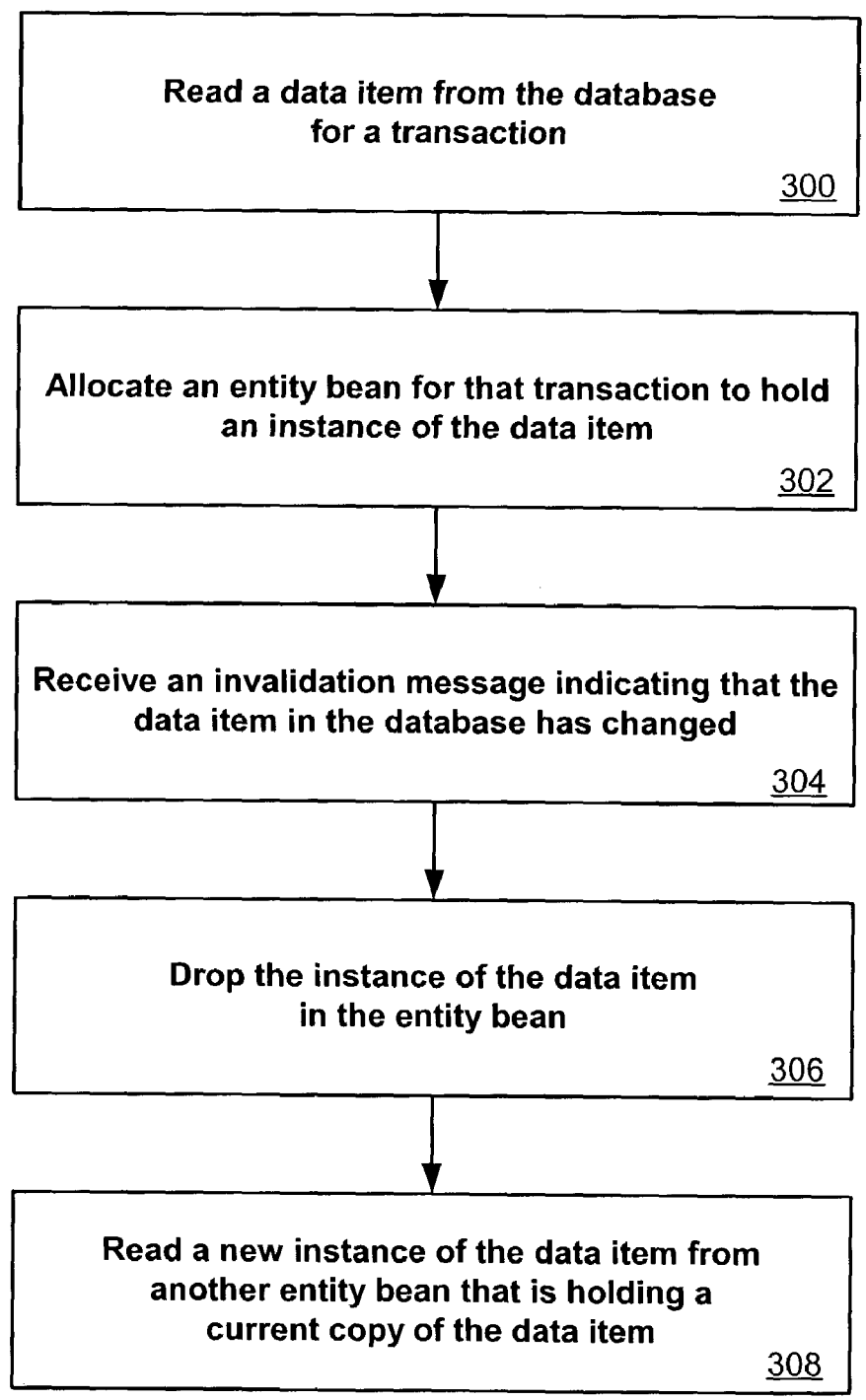
FIG. 3 is a flowchart showing the steps of a method in accordance with the embodiment of the FIG. 1.

An example of such a method is shown in FIG. 3. A data item is read from a database for a transaction 300. An entity bean is allocated by the system to hold an instance of that data item for the transaction 302. An invalidation message is received by the entity bean indicating that the data item in the database has changed 304. The entity bean drops its instance of the data item 306. A new instance of the data item is read from another entity bean that holds a current copy of the data item 308. This can be, for example, the entity bean that caused the data item to be updated. If no entity beans hold a current version of the data item, the entity bean can re-read the item from the database.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A system for improved data caching for transactions, comprising:
    a datatbase capable of containing a data item;
    a cache capable of caching at least one instance of the data item in the database, each instance stored in the cache in a read-only bean;
    an allocation algorithm adapted to allocate each instance of the data item held by the bean in the cache to a transaction;
    wherein the bean is configured to update the instance of the data item in the cache by reading from the database when demand for access to the database is reduced; and
    wherein the bean is configured to update the instance of the data item by reading from another bean in the cache holding the same instance of the data item when demand for access to the database is increased.

2. A system according to claim 1, further comprising:
    a plurality of read-only entity beans that can hold an instance of the data item.

3. A system according to claim 1, wherein:
    the cache comprises an entity bean container.

4. A system according to claim 1, further comprising:
    a plurality of read-only beans, each bean capable of holding an instance of the data item, each bean further being capable of updating the instance of the data item by reading from another bean holding an instance of the data item.

5. The system of claim 4, further comprising:
    an index having a list of beans with instances of the same data item.

6. The system of claim 4, further comprising:
    an index having a list of beans with updated instances of the same data item.

7. A system according to claim 1, further comprising:
a plurality of read-only beans, each bean being capable of holding an instance of the data item, each bean having a time-out value that determines how long the bean holds that instance of the data item.

8. A system according to claim 1, further comprising:
a notification algorithm capable of notifying each instance of the data item when the data item in the database is changed.

9. The system of claim 1, further comprising:
a plurality of read-only beans, each of the plurality of beans holding an instance of the data item, each bean having a time-out value that determines how long the bean holds the instance of the data item and thereafter the bean updates the instance of the data item by one of reading from another bean holding an instance of the data item or reading from the database.

10. The system of claim 1, further comprising:
an entity bean capable of holding an instance of the data item in the cache.

11. The system of claim 1 wherein:
each bean is an entity bean.

12. The system of claim 1, further comprising:
a plurality of beans holding each instance of the data item, wherein each bean is capable of updating a respective instance of the data item by reading from another bean holding an instance of the data item, as well as by reading from the database.

13. The system of claim 12, wherein:
the system preferentially reads from the database in order to update an instance of a data item when the demand for access to the database is reduced.

14. A system for improved data caching for transactions, comprising:
a database capable of containing a data item;
a cache capable of caching instances of the data item;
a read-only bean for each instance of the data item, each read-only bean adapted to hold an instance of the data item and being capable of updating the instance of the data item by reading an instance from the database or by reading from another read-only bean in the cache; and
a notification algorithm implemented by the bean for notifying other beans in the cache that the data item in the database has changed.

15. A system according to claim 14, wherein:
the cache comprises a bean container.

16. A system according to claim 14, wherein:
the bean is further capable of updating the instance of the data item by reading from the database.

17. A system according to claim 14, further comprising:
a time-out value for the bean that determines how long the bean holds that instance of the data item.

18. A system according to claim 14, further comprising:
a notification algorithm adapted to notify each bean when the data item in the database is changed.

19. The system of claim 14, further comprising:
a time-out value for each bean, the time-out value capable of determining how long a bean holds the instance of the data item, the bean capable of thereafter updating the instance of the data item by one of reading from another bean holding an instance of the data item or reading from the database.

20. The system of claim 14, further comprising:
an index having a list of beans with instances of the same data item.

21. The system of claim 14, further comprising:
an index having a list of beans with updated instances of the same data item.

22. A computer executable method for improved data caching for transactions, comprising:
allocating a read-only bean for each transaction, to hold an instance of a data item, wherein each read-only bean is contained in a cache;
reading the instance of the data item from a database to each bean; and
updating the bean by reading a copy of the data item from the database when demand for access to the database is reduced; and
updating the bean by reading the copy of the data item from another bean in the cache when the demand for access to the database is increased.

23. A method according to claim 22, further comprising:
assigning a time-out value for each bean, the time-out value determining when the bean is updated.

24. A method according to claim 22, further comprising:
notifying a bean holding an instance of the date item when the data item in the database is changed.

25. The method of claim 22, wherein:
allocating further includes allocating an entity bean for each transaction.

26. The method of claim 22, wherein:
each bean is an entity bean.

27. The method of claim 22, wherein:
each bean is capable of being updated by at least one of reading from another bean and by reading from the database.

28. The method of claim 27, wherein:
the system preferentially reads from the database in order to update an instance of a data item when the demand for access to the database is reduced.

29. The method of claim 22, further comprising:
notifying each bean each time the data item in the database has changed.

30. A computer executable method for improved data caching for transactions, comprising:
reading a data item from a database for each transaction;
allocating a read-only bean for each transaction to hold an instance of the data item, each read-only bean contained in a cache;
updating the bean by reading a copy of the data item from the database or by reading from another bean holding an instance of the data item; and
notifying other beans in the cache by the read-only bean that the data item in the database has been changed.

31. A method according to claim 30, further comprising:
assigning a time-out value for each bean, the time-out value determining when the bean is updated.

32. A method according to claim 30, further comprising:
notifying each bean holding an instance of the data item when the data item in the database is changed.

33. The method of claim 30, wherein:
each bean is an entity bean.

34. The method of claim 30, wherein:
each bean is capable of being updated by at least one of reading from another bean and by reading from the database.

35. The method of claim 34, wherein:
the system preferentially reads from the database in order to update an instance of a data item when demand for access to the database is reduced.

36. A system for improved data caching for transactions comprising:

a database adapted to contain a data item;
a cache capable of caching multiple instances of the data item, wherein each of said instances can be associated with a transaction;
a read-only bean associated with each instance of the data item in the cache, the bean implementing an algorithm to find recent instances of the data item held by other beans in the cache;
wherein the data item in each read-only bean can be updated by both of reading from the database and reading from another bean if that other bean has a more recent version of the data item than the read-only bean; and
wherein multiple transactions can access multiple respectively associated read-only beans in a non-serial manner in order to access the data item.

37. The system of claim 36, wherein:

a transaction can be carried on using the data in the read-only bean without requiring a lock on the bean.

* * * * *